Oct. 31, 1961  J. J. EBERL ET AL  3,006,561
DISINTEGRATION OF RESIN FOAMS
Filed April 11, 1960
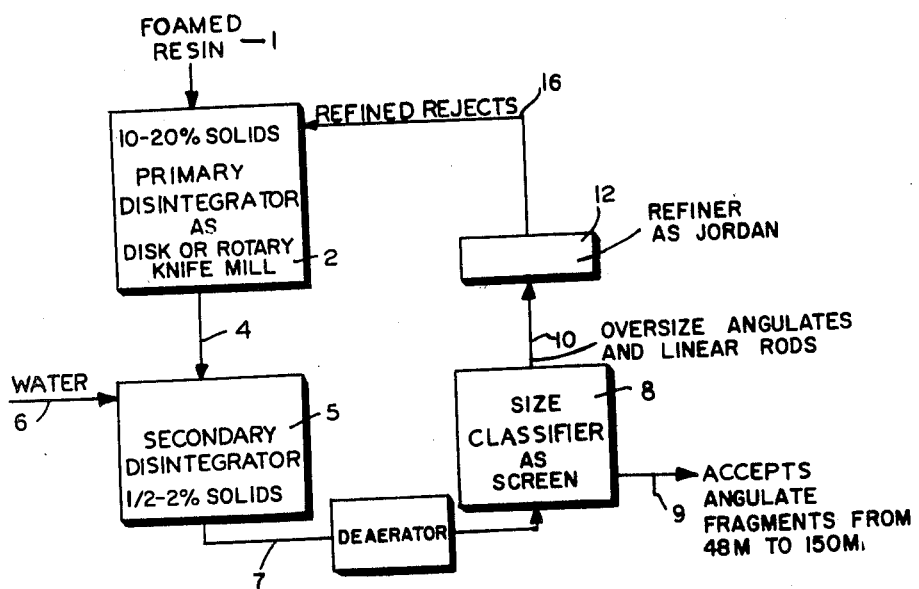
INVENTORS
SYDNEY COPPICK
JAMES J. EBERL
BY Harold L. Jenkins
ATTORNEY

3,006,561
DISINTEGRATION OF RESIN FOAMS
James J. Eberl, Moylan, and Sydney Coppick, Ridley Park, Pa., assignors to Scott Paper Company, Chester, Pa., a corporation of Pennsylvania
Filed Apr. 11, 1960, Ser. No. 21,373
10 Claims. (Cl. 241—29)

The present invention relates to the disintegration of foamed aminoplast resins and more particularly to a process of controlled disintegration of such resin foams from which may be realized products of superior physical characteristics and of enhanced value as a component of paper stocks.

The past few years have seen an increased interest in the applications of synthetic resinous materials to paper making and special attention has been directed to the foamable resins, whose structures offer a good source of physical modifiers for paper stocks. A urea-formaldehyde prepolymer, for example, formed by condensing urea and formaldehyde in an approximate 1 to 2 molar ratio may be foamed by addition to a cellulated mass of a surface active agent, water and an acid catalyst such as sulfuric acid. Regulation of the density of the cellulated matrix by aeration thereof enables control of the density of the resin foam within limits of from 0.2 to 0.8 pound per cubic foot. Additionally it has been noted that the degree of aeration and matrix agitation affects the fineness of the ultimate foam which may have as many as $10^5$ cells per cubic centimeter. Upon curing in a moist atmosphere in the presence of hardening agents there results a reticulated structure whose skeletal configuration is composed of rod-like strands arranged in a three-dimensional network and which upon exposure to hydraulic shear may be disintegrated into fragments or segments of various degrees of complexity. Melamine-formaldehyde resins, mixed melamine-urea-thiourea condensation products with formaldehyde and phenol-formaldehyde resins may be similarly processed to produce light-weight foams. Other foamed resins are disclosed in U.S. Patents Nos. 2,273,367, 2,384,387, 2,559,891 and 2,813,780; Belgian Patents Nos. 527,694, 565,130 and 569,190; and Italian Patent No. 590,887.

The foamed resins, described above in the wet or dry state, may be disarranged by simple grinding, wet or dry, to produce angulate fibrous resin fragments comparable at least in linear dimensions to the pulp fibers with which they will be blended in the production of modified paper stock. Even the most simple grinding operation results in a wide variety of geometrical shapes and sizes of resin fragments. The average size and geometric complexity of foamed structural assemblies is reduced by increased severity of the disintegration process, but in all cases the disintegration product as directly secured is quite heterogeneous structurally, except in the case of very severe disintegration where the foam structure (interconnecting strands) is broken down into its ultimate structural elements, namely linear rod-like segments which in idealized form may be considered triangular prisms.

The geometry of the various types of disintegration products has varying effects upon the properties of paper into which it is incorporated. For example, as to high bulking effect, such property depends in large measure upon the incorporation of air or the creation of a void within the sheet in the sheeting operation. As to the former, the incorporation of air directly, the inherency of the disintegrate to enclose or packet air is of high importance. For example, when the starting material, the foamed resin is a finely porous product, a mild form of disintegration is desirable, that is, what amounts in effect to a mere subdividing or comminution of the foam to a smaller unit in which it can be physically incorporated as a filler.

However, very large size and complex foam residue particles deter from the appearance, uniformity and surface texture of the paper prepared from blends of wood pulp and disintegrated foam. More severe disintegration operations result in the gradual disappearance of the very large residues and a consequent improvement in the appearance, uniformity and surface texture of the resulting paper. However, coincident with the breakdown of the very large foam residues there occurs also a further general breakdown of the material and an accumulation of residues of a linear rod-like nature with little or no complexity of geometry. This results in a deterioration in the potential bulking capacity of animoplast foam disintegrate and a reduction in the softness of paper prepared from foam and wood pulp combinations.

It is a primary object of the present invention to provide a controlled process for the disintegration of a finely pored aminoplast resin foam in order to obtain maximum uniformity of product of optimum physical characteristics for use as a component of paper stock.

It is another object of our invention to provide for the selective disintegration and classification of an aminoplast resin foam whereby to produce a material of special values as a component of paper stock.

Other objects and advantages of this invention will be readily apparent from the following detailed description of certain preferred embodiments thereof when taken in conjunction with the accompanying drawing, wherein the single figure is a schematic representation of the general flow diagram of our new process.

Turning to the drawing, a cured resin foam 1, which may be initially fragmented or shredded, if desired, to assist its subsequent processing is fed into a primary disintegrator 2, which is preferably of the disc type, by any suitable means. Sufficient water is present in the disintegrator 2 either as an element of recycled material or as make-up supply to insure a solids content of from 10 to 20% in the slurry undergoing treatment. The disintegrated foam is discharged through a conduit 4 into a secondary disintegrator 5 into which sufficient water is introduced through a feed line 6 to reduce the consistency or solids content of the slurry to between 0.5 and 2%. The disintegrator 5 discharges through a conduit 7 into a classifier 8 wherein the doubly disintegrated foam is separated into fractions of graded sizes. Residues of proper complexity of geometry, particle size and/or angulate configuration are removed at 9 as acceptable components of paper furnishes. Residues of exceptionally gross complexity and comminuted particles lacking in linearity are led through a conduit 10 into a refiner 12 preferably of the Jordan type. By suitable adjustment of the disc disintegrator 1 and residence time within the secondary disintegrator 5, the desirable degree of material disintegration may be obtained and a uniform product best suited for combination with cellulose fibers is consistently produced.

The following examples are illustrative of our inventive concept.

Example 1

An unbleached kraft pulp of southern pine was circulated in a Valley beater together with Mexican bagasse pith and Colfoam insulation shread. Colfoam is a urea-formaldehyde foam produced by Colton Chemical Company, Cleveland, Ohio, in accordance with the teaching of U.S. Patent No. 2,273,367 and fragmentized into irregularly shaped interlocked particles ½ inch or less in diameter. Slushing of the furnish which consisted of 72% wood pulp, 14% pith and 14% of shredded resin foam was effected in an unloaded beater at a consistency of 1% for 5 minutes. The resultant slurry was further treated for 5 minutes in the British standard disintegrator and handsheets were prepared therefrom. A noticeable increase in the bulk of the paper sheets resulted.

*Example II*

The Colfoam insulation shread, as identified in Example I, was processed in the British standard disintegrator for 5 minutes at 0.4% consistency and blended with a beaten bleached sulphite pulp of western hemlock. Handsheets made from the composite furnish again exhibited improved bulk as well as increased opacity directly proportional to the disintegrated foam content thereof.

*Example III*

A mixture of 91% of bleached sulphite pulp and 9% of the Colfoam product of Examples I and II was processed for 5 minutes in a Cowles Hydropulper at a consistency of 0.5%. The product was diluted to a consistency of 0.275% and screened through a Sprout Waldron flat screen having 0.008 inch slots to remove residual foam aggregates of excessive size. Handsheets were formed from the screened furnish and these exhibited improved uniformity and surface softness over the handsheets of Examples I and II.

*Example IV*

The Colfoam product employed in the previous example was disintegrated in an Abbe mill, refined in a single disc Bauer mill at an 8 ampere loading and cleaned in a 6 inch Bauer centricleaner with a ¼ inch reject tip at 0.5% consistency. The acceptable product was further processed in a 3 inch Bauer centricleaner operating at a pressure differential of 40 pounds per square inch and blended with a bleached sulphite pulp from western hemlock. TAPPI handsheets made from furnishes containing from 18 to 33% by weight of the disintegrated foam were soft and smooth and possessed increased bulk and opacity over handsheets made of the wood pulp alone. The composite sheets exhibited an improved surface appearance over those of the preceding example.

*Example V*

A spray-dried urea-formaldehyde condensate, as described in U.S. Patent No. 2,858,195 and British Patent No. 768,562, was converted to a foamed structure in accordance with the teachings of Belgian Patent Nos. 527,694, 565,130 and 569,190 and cured by heating in moist atmosphere in the presence of a hardening agent until it contained 29% by weight of solids. The foam was subjected to the high shear of a Waring Blendor at 0.8% consistency. Portions of the moist foam subjected to varying periods of disintegration were blended with bleached sulphite pulp of western hemlock in a ratio of 30 parts foam to 70 parts of wood pulp, TAPPI handsheets were prepared therefrom and the following results noted:

| Time (minutes): | Bulk cc./gm. |
|---|---|
| 2 | 2.54 |
| 5 | 2.49 |
| 10 | 2.40 |
| 15 | 2.36 |
| 20 | 2.17 |
| 30 | 2.17 |
| Control 100% wood pulp | 1.77 |

It will be observed that the increase in bulk obtained by the inclusion of foam in the paper furnish was only moderate and is occasioned by excessive distintegration of the foamed structure and the loss of the angulate three-dimensional configuration of the foam fragments under the conditions present in the blender.

*Example VI*

A foamed resin structure of the type prepared and used in Example V was processed at 0.5% consistency in the British standard disintegrator. The product was again blended with wood pulp as in Example V and the following results obtained:

| Time (minutes): | Bulk cc./gm. |
|---|---|
| 5 | 3.25 |
| 30 | 3.28 |
| Control 100% wood pulp | 1.77 |

The higher bulk values of the paper sheets are demonstrative of the retention of angulate three-dimensional configuration in the foam disintegrated under conditions of milder shear.

*Example VII*

A foamed urea-formaldehyde resin of the type set forth in Example V was cured for 3 hours at 100° C. and approximately 75% relative humidity to improve the elastic toughness of the reticulated structure. The cured moist foam was subjected to disintegration in the British standard equipment for periods of 5 and 50 minutes while separate samples of the foam were similarly exposed to disintegration in a Waring Blendor for the same time periods. Portions of the disintegrated foams were blended with bleached sulphite pulp in a ratio of 30 parts of foam to 70 parts of wood pulp and TAPPI handsheets prepared from such furnishes. The effect of the degree of disintegration upon the bulk producing capacity of the disintegrated foam is quite evident from the results set forth in the table below:

| Paper from: | Bulk (cc./gm.) |
|---|---|
| Control (wood pulp alone) | 1.44 |
| 5 minutes British standard disintegration (30 parts foam to 70 parts pulp) | 4.00 |
| 30 minutes British standard disintegration (30 parts foam to 70 parts pulp) | 3.44 |
| 5 minutes Waring Blendor disintegration (30 parts foam to 70 parts pulp) | 3.28 |
| 30 minutes Waring Blendor disintegration (30 parts foam to 70 parts pulp) | 2.75 |

The milder hydraulic shear conditions of the British standard disintegrator permits the retention of greater angulate three-dimensional structural complexes in the fragmentized foam. The 30 minute exposure in the British standard equipment results in a minimum of unidimensional rod-like elements or finer particles. A comparable exposure time to the more severe hydraulic shear of the Waring Blendor substantially eliminates from the foam structure any multiaxial or three-dimensional assemblies and the product is almost entirely granular in character.

The effect upon foamed material of the severity of the disintegration processes may also be demonstrated by classification of the disintegrated product. For example, the disintegrated foam of Example VI when classified in a Bauer-McNett fractionator produced the following classification of sizes:

| Percent of material: | Retained on mesh size |
|---|---|
| 0.4 | 14 |
| 0.3 | 28 |
| 17.5 | 48 |
| 54.5 | 150 |
| 27.3 | Less than 150 |

Disintegration of the same foamed resin in the British standard equipment at a consistency of 0.4%, when fractionated, showed the following results:

| Percent of material: | Retained on mesh size |
|---|---|
| 0 | 14 |
| 0 | 28 |
| 24.9 | 48 |
| 58.1 | 150 |
| 17.0 | Less than 150 |

The above-classified disintegrated material was blended with bleached sulphite pulp from western hemlock in the ratio of 7 parts of pulp to 3 parts of foam and TAPPI handsheets prepared from the furnish had the following properties:

| Sample: | Specific volume (bulk) cc./gm. |
|---|---|
| Control (100% wood pulp) | 1.55 |
| Retained on 48 mesh | 3.15 |
| Retained on 150 mesh | 3.00 |

*Example VIII*

A porous resin foam of the type described in Example VII was cured for 3 hours at 100° C. in a closed system maintained at 75% relative humidity. The cured foam was disintegrated in the British standard equipment for periods of both 5 and 30 minutes and similar disintegration effected in the Waring Blendor. The products of each form of disintegration were deaerated, utilizing 1 cycle of vacuum at 29 inches of mercury and subsequently fractionated in a Bauer-McNett classifier. The separate fractions were blended with bleached sulphite pulp from western hemlock, beaten to 412 Canadian standard freeness in the ratio of 30% foam to 70% wood pulp and TAPPI handsheets prepared therefrom. Foam fractionation results follow:

| Disintegration equipment | Disintegration time (minutes) | Percent disintegrated foam retained on mesh size | | | | |
|---|---|---|---|---|---|---|
| | | 14 | 28 | 48 | 150 | Less than 150 |
| British standard | 5 | 0 | 0 | 12.8 | 53.9 | 33.3 |
| Do | 30 | 0 | 0 | 0.8 | 53.1 | 46.1 |
| Waring blender | 5 | 0.6 | 1.0 | 0.7 | 24.4 | 73.3 |
| Do | 30 | 0 | 1.0 | 1.0 | 20.0 | 78.0 |

The properties of the handsheets are given in the table.

| Paper prepared from— | Disintegration | Time (min.) | Mesh | Specific volume cc./gms. |
|---|---|---|---|---|
| 100% Wood Pulp | | | | 1.44 |
| 70% Wood Pulp Plus 30% foam | British | 5 | 48 | 3.53 |
| | do | 5 | 150 | 3.26 |
| | do | 30 | 150 | 2.72 |
| | Waring | 5 | 150 | 2.43 |
| | do | 30 | 150 | 2.24 |

*Example IX*

A porous resin foam of the type described in Examples VII and VIII was cured for 3 hours at 86° C. in a recirculating air oven maintained at a 40% relative humidity. The cured foam was disintegrated in a hydropulper at 0.1% consistency for 3 minutes after which the slurry was dewatered to 10% consistency and deaerated utilizing two vacuum cycles of 20 inches of mercury. The deaerated stock was diluted to 0.3% consistency and fed to a side hill screen having 65 wires to the mesh inch inclined at an angle of 60° to the horizontal. One third of the foam fragments were retained on the screen and collected as "accepts." The accepts and rejects, when subjected to a Bauer-McNett classification produced the following yields:

| | Percent retained on mesh | | | | |
|---|---|---|---|---|---|
| | 28 | 48 | 100 | 150 | <150 |
| Material | 0 | 4.6 | 20.6 | 60.6 | 14.2 |
| Accepts | 3.7 | 51.5 | 28.7 | 4.1 | 12.0 |
| Rejects | | | | | |

*Example X*

1080 parts by weight of urea, 3170 parts of 37% USP formaldehyde (containing 5% methyl alcohol), 90 parts of water, 9 parts of 4 M sodium hydroxide, and 185.4 parts of 24% ammonium hydroxide were placed into a stainless steel reaction kettle which was equipped with a reflux condenser, a steam jacket for heating and a mechanical agitator. The reaction mixture was heated under agitation to reflux temperature, about 98° C., for 15 minutes and then 5.5 parts of 4 M phosphoric acid were added. Reflux was continued for about 1 hour until the viscosity of a test portion, cooled to 20° C., was about 50 centistokes. At this point the reaction was stopped by the addition of 22 parts of 10% sodium hydroxide solution. The resulting resin syrup contained about 42% non-volatile solids.

To 52 parts of the above resin syrup were added 1 part of urea, 5 parts of 34% Teepol (a sodium secondary alkyl sulfate produced by the Shell Chemical Corporation), and 42 parts of water. The diluted resin solution was then converted into a partially hardened foam according to the techniques of British Patent No. 755,173 (W. Bauer) wherein aeration of the resin solution and subsequent injection of acid catalyst (0.65 M phosphoric acid) assist in the formation of the partially hardened foam.

Foam was collected in wire mesh containers (15" x 32" x 8") which were placed in a circulating air curing oven having inside dimensions of 3½' x 4' x 12'. Air was circulated at a rate of about 1000 c.f.m. while the temperature and relative humidity were maintained at 85° and 40% respectively. The containers of foam were removed from the oven after 3 hours of curing. Any brittle crust which had formed on the foam blocks was removed with a knife.

Blocks of cured and skinned foam were disintegrated in a Morden Slush-Maker at a consistency of about 1%. After being further diluted to about 0.5% consistency, the resulting slurry of angulate fibrous fragments of UF foam was drawn continuously into the top of a vacuum tank in which a vacuum of about 26 in. Hg. and constant vigorous agitation were maintained. As the dilute slurry passed into the vacuum tank, entrained and dissolved gases were forced from the slurry and removed by a vacuum pump. The slurry fell by gravity to the bottom of the tank from which it was removed by a positive displacement (Moyno) pump at the same rate (about 10 g.p.m.) as the slurry was being drawn into the tank. Foam fragments deaired in this fashion exhibited no tendency to float.

The deaired, 0.5% slurry was cleaned in a 3 inch Bauer centricleaner equipped with a $\frac{7}{32}$ inch reject tip and operated at a pressure differential of 40 p.s.i.g. After centricleaning the slurry was again deaired as described above and pumped to a stock chest supplying a four drinier-type paper machine capable of trimming a 20 inch sheet.

In a separate stock chest supplying the same paper machine a paper making furnish comprised of 60% bleached sulfite pulp from western hemlock, 25% bleached kraft pulp from northern white pine, and 15% bleached kraft pulp from southern hardwoods was blended. After refining the pulp furnish to a Canadian standard freeness of about 420 cc., approximately 1% (based on the weight of dry pulp) of urea-formaldehyde wet strength resin, and sufficient sulfuric acid to reduce the pH of the furnish to 4.0 were added.

Using only the above described blend of wood pulp, the paper machine was started and the basis weight of the sheet adjusted to about 8.7 lbs. per ream. Without interrupting the operation of the paper machine, foam slurry was metered from its separate chest into the machine system at the suction side of the fan pump by means of a positive displacement, variable speed pump. Foam was thus injected until the basis weight of the sheet on the paper machine reel was 10.2 lbs. per ream. In this manner paper containing 15% foam fragments was prepared. Machine operating conditions were as follows:

| | | |
|---|---|---|
| Machine speed | f.p.m. | 1000 |
| First pressure roll load | p.l.i. | 300 |
| Second pressure roll load | p.l.i. | 400 |
| Crepe | percent | 20 |
| Moisture | do | 8 |

Properties of the resultant paper were as follows:

| | |
|---|---|
| Basis weight | 10.2 lbs./ream. |
| Foam content | 15%. |
| Stretch | 19%. |
| Tensile | 5 oz. |
| Caliper | 0.033 in. at 8 p.s.i. |
| Specific volume | 5.0 cc./g. |

Two ply sheets of the above paper were embossed between two steel rolls in order to impart a pattern to the paper and convert it into two ply dinner napkins. During the embossing operation it was noted that the presence of foam in the paper greatly facilitated embossing thus enabling the use of lower nip pressures and temperatures than are normally required for embossing paper.

From the foregoing it is quite clear that the resin inclusions in the various paper furnishes improve the bulk of the sheeted paper, increase sheet opacity in direct proportion to resin content and at the same time contribute to improvement of other properties which are of particular value to such products. Immeasurable physical properties, ascertainable only upon inspection, of the papers of our invention are increased softness, enhanced surface attractiveness and feel.

It has also been ascertained that the inclusion of angulate fragments of foamed aminoplast resins in paper stocks will improve the absorbencies of ultimate paper products, and, moreover, the rate at which these absorbencies deteriorate with aging is greatly reduced. These resin inclusions also result in increased air entrapment within the sheeted paper, thus leading to products containing excellent thermal barriers. The insulating quality of the modified sheeting will be dependent to a large extent upon the degree of disintegration of the foamed resin employed therein. Where necessary, or desirable, the high bulk, insulating and/or absorptive paper of our invention may be laminated to thermoplastic film material in order that there will be established an impervious skin or layer upon the composite sheeting and its utility as an insulating medium will be increased.

It is equally apparent that in the most carefully controlled disintegrations, a range of products shapes, sizes and contours inevitably results following the irregular disarrangement of the urea-formaldehyde foam structure. The classification and/or screening operations enable separation of the disintegrated products into different grades and as has been demonstrated above, the physical properties of papers embodying such products are directly affected by the resin additions. It is, of course, essential that the average overall dimensions of the disintegrated foam fragments be reduced to an extent that they are compatible with wood pulp fibers ranging in size from 0.05 mm. to 4.0 mm., or as alternatively expressed, it is preferred that the disintegrated foam fragments be such that they will pass a 28 mesh screen and be retained on a 150 mesh screen.

It will be obvious that variations in the procedural details leading toward foam disintegration and classification are possible without departing from the spirit of the present invention or the scope of the appended claims.

What we claim is:

1. A process of converting a foamed aminoplast resin structure into a component of a paper furnish which comprises the steps of disintegrating the resin foam at high consistency to effect a primary reduction thereof, diluting the initially disintegrated material to a low consistency, disintegrating said material to effect a secondary reduction thereof and classifying the product into size and shape fractions acceptable for use in a paper furnish.

2. A process as defined in claim 1 in which the initial disintegration is effected at a consistency of from 10 to 20% and the second disintegration is effected at a consistency of from 0.5 to 2%.

3. A process of converting a foamed urea-formaldehyde resin structure into a component of a paper furnish which comprises disintegrating the resin foam to effect reduction thereof and classifying the product to recover substantially only the angulate fragments passing through a screen of less than 48 mesh and retained on a screen of 150 mesh, which fragments possess spatial geometric size adapting them for combination with cellulose fibers.

4. A process as defined in claim 3 in which the disintegrated material is deaerated prior to its classification.

5. A process of converting a foamed urea-formaldehyde resin structure into a component of a paper furnish which comprises the steps of disintegrating an aqueous suspension of resin foam fragments to effect size and shape reduction thereof, classifying the disintegrated product to eliminate therefrom all oversize coarse residues and collecting substantially only the angulate fragments retained on screens of mesh density varying between 48 and 150, the fragments of substantially uniform spatial geometric size adapting them for combination with cellulose fibers in a furnish yielding paper products of consistent physical characteristics.

6. A process as defined in claim 5 in which the disintegrated material is deaerated prior to its classification.

7. A process of converting a cured, three-dimensional, reticulated aminoplast resin foam into a component of a paper furnish which comprises mechanically disintegrating said resin foam into angulate agglomerates of sizes compatible with wood fibers and halting such disintegration prior to material decomposition into discrete linear rods.

8. A process of converting a cured, three-dimensional, reticulated urea-formaldehyde resin foam into a component of a paper furnish which comprises mechanically disintegrating said resin foam under progressively increasing rigorous conditions into angulate agglomerates of sizes and shapes compatible with wood fibers and halting such disintegration prior to material decomposition into discrete linear rods.

9. A process of converting a cured, three-dimensional, reticulated urea-formaldehyde resin foam into a component of a paper furnish which comprises mechanically disintegrating said resin foam under progressively increasing rigorous conditions into angulate agglomerates of sizes and shapes compatible with wood fibers and halting such disintegration prior to material decomposition into discrete linear rods and classifying the product to recover substantially only the angulate fragments passing through a screen of less than 48 mesh and retained on a screen of 150 mesh, which fragments possess spatial geometric size adapting them for combination with cellulose fibers.

10. A process as defined in claim 9 in which the disintegrated material is deaerated prior to its classification.

References Cited in the file of this patent

UNITED STATES PATENTS

| | | |
|---|---|---|
| 1,847,773 | Lionne | Mar. 1, 1932 |
| 2,838,801 | De Long et al. | June 17, 1958 |